United States Patent [19]
Amitani et al.

[11] Patent Number: 5,014,094
[45] Date of Patent: May 7, 1991

[54] PROCESS UNIT AND A MULTI-COLOR IMAGE FORMING APPARATUS USING THE SAME

[75] Inventors: Joji Amitani, Yokohama; Osamu Hoshino, Tokyo, both of Japan

[73] Assignee: Canon Kabushiki Kaisha, Tokyo, Japan

[21] Appl. No.: 515,347

[22] Filed: Apr. 30, 1990

Related U.S. Application Data

[63] Continuation of Ser. No. 253,893, Oct. 5, 1988, abandoned, which is a continuation of Ser. No. 875,966, Jun. 19, 1986, abandoned, which is a continuation of Ser. No. 521,832, Aug. 10, 1983, abandoned.

[30] Foreign Application Priority Data

Aug. 17, 1982 [JP] Japan .................... 57-142313
Oct. 4, 1982 [JP] Japan .................... 57-174271

[51] Int. Cl.⁵ ............................................ G03G 15/01
[52] U.S. Cl. ................................... 355/326; 355/200; 355/210; 355/245
[58] Field of Search .............. 355/200, 210, 245, 260, 355/326, 327

[56] References Cited

U.S. PATENT DOCUMENTS

| | | | |
|---|---|---|---|
| 3,985,436 | 10/1976 | Tanaka et al. | 355/200 |
| 4,097,139 | 6/1978 | Hauser et al. | 355/326 |
| 4,162,843 | 7/1979 | Inoue et al. | 355/327 |
| 4,281,918 | 8/1981 | Fortmann | 355/260 |
| 4,329,044 | 5/1982 | Kitajima et al. | 355/297 |
| 4,386,838 | 6/1983 | Hirabayashi et al. | 355/200 |
| 4,462,677 | 7/1984 | Onoda | 355/210 |
| 4,551,000 | 11/1985 | Kanemitsu et al. | 355/210 |

FOREIGN PATENT DOCUMENTS

57-211175 12/1982 Japan .

Primary Examiner—Fred L. Braun
Attorney, Agent, or Firm—Fitzpatrick Cella Harper Scinto

[57] ABSTRACT

A color image forming apparatus that can detachably receive a plurality of process units into associated ones of a plurality of color image forming stations. Each of such detachable process units effects imaging in one of a plurality of different colors. The units are substantially identical in structure, configuration, and dimension, but differ with respect to indexing elements which allow each unit to be set only at its proper color image forming station in the image forming apparatus.

13 Claims, 7 Drawing Sheets

PROCESS UNIT AND A MULTI-COLOR IMAGE FORMING APPARATUS USING THE SAME

This application is a continuation of U.S. application Ser. No. 07/253,893 filed Oct. 5, 1988, now abandoned, which was a continuation of U.S. application Ser. No. 06/875,966 filed June 19, 1986, now abandoned, which was a continuation of U.S. application Ser. No. 06/521,832 filed Aug. 10, 1983, now abandoned.

BACKGROUND OF THE INVENTION

1. Field of the Invention

This invention relates to a process unit detachably mountable into an image forming apparatus and including as a unit a part or all of the process means necessary for image formation, and to image forming apparatus, more particularly, multi-color image forming apparatus using plurality of such units.

2. Description of the Prior Art

Conventionally, natural color or multi-color reproduction or printing utilizing an electrophotographic process has been commercialized. In such reproduction or printing systems, color-separated images are formed on a single photosensitive member, sequentially, and then transferred to one and the same image transfer material superposedly to form a desired multi-color image.

Figure 1:
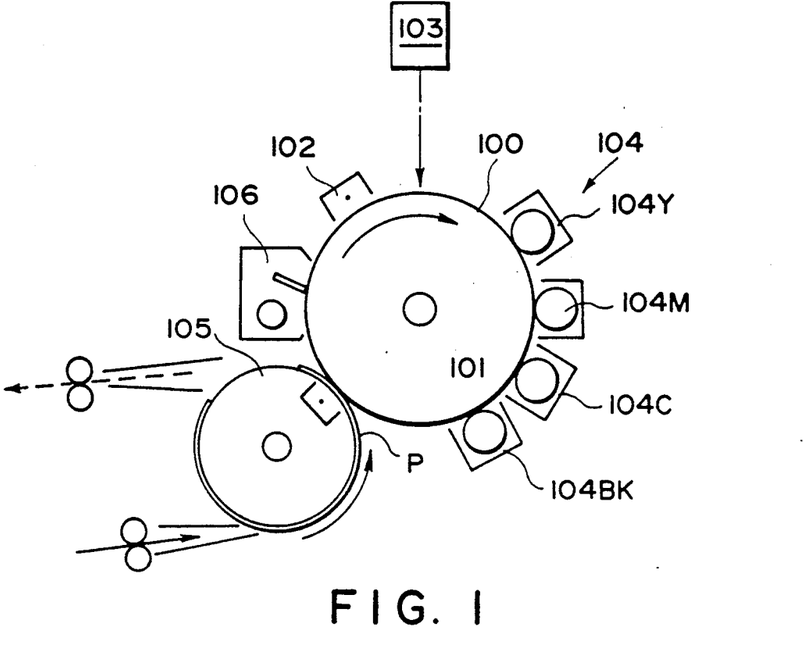
FIG. 1 shows a cross-section of one of typical conventional multi-color image forming apparatus.

FIG. 1 shows a cross-section of typical a one of such conventional multi-color reproduction systems, wherein, around a photosensitive member 100 which is rotatable about a shaft 101 in the direction in the Figure, there are provided electrophotographic process means, namely, corona charger 102, image exposure means 103, developing device 104, image transfer drum 105 and a drum cleaner 106. The image exposure device is shown as a block, since the detailed structure thereof is known. However, it may be of laser beam scanning type; color-separation exposure type wherein an original image is color-separated by filters; or other types. The developing device 104 includes the separate developing means 104Y, 104M and 104C for yellow toner, magenta toner and cyan toner, respectively. Additionally, black toner developing means 104BK may be used. Those developing means are so controlled as to selectively and sequentially act on the photosensitive drum 100.

The image transfer drum 105 rotates about a shaft 107 in the same peripheral movement direction and substantially at the same speed as the photosensitive drum 100. The transfer sheet P is fed to the image transfer drum 105 by a paper feed mechanism not shown, and is wound around the image transfer drum so that it can rotate, facing the surface of the photosensitive drum 100.

In operation, a first step is effected, wherein a yellow component of the original image is projected onto the photosensitive drum 100, and wherein only the yellow toner developing means 104Y is operated. By this, yellow toner image is formed on the photosensitive drum 100 and then transferred onto the transfer sheet P. The detail of the toner image formation is well known so that it is omitted for the sake of simplicity.

Then, a second step is executed, wherein a magenta component of the original image is projected onto the photosensitive drum 100, and wherein only the magenta toner developing means 104M is operated. By the second step, a magenta toner image is formed on the photosensitive drum 100 and then transferred onto the same transfer sheet P, superposedly on the yellow toner image thereon.

Next, the third step is executed in a similar manner for the cyan toner. Further, the fourth step is carried out for the black toner.

Thus, on the transfer sheet P retained on the transfer drum 105, the yellow component image, magenta component image, cyan component image and black component image are superposed so that a multi-color image of the original is formed thereon with the colored toner particles.

The transfer sheet carrying the multi-color toner image is then released from the image transfer drum and conveyed by an unshown conveying mechanism to an image fixing station where the toner image is fixed on the transfer sheet P, whereafter the transfer sheet P is discharged out of the apparatus as a multi-color copy.

Conventional machines of this type, however, involve the following drawbacks:

(i) Since the transfer sheet P is wound around the transfer drum, retained there and rotated plural turns, typically 3 times, the throughput is small (3–5 copies per minute for A4 size). Further, with the increase in the number of separated colors, the throughput decreases. For example, four color-components reproduction takes four times of the time required for a single color copy.

The decrease in the throughput is particularly remarkable in the type machine wherein the image exposure device scans the original to be copied. One of the reasons is that the scanning means takes time for the returning movement to its home position, which movement is the waste of time from the standpoint of image formation. In another type, i.e., other than the original scanning type there is a waste of time due to the, the the photosensitive drum 100 having to pass by the developing devices which are not operated.

(ii) The distances from the latent image forming station to the yellow toner developing means, from the same station to the magenta toner developing means, from the same station to the cyan toner developing means and black toner developing means, are unavoidably different so that the dark decay of the latent image and the attenuation of the light area potential are not equal for all of the colors. For this reason the relation between the latent image potential and the image density (so-called "γ" property) is different for the respective colors. The result is that the tone of the printed or copy image is different from that of the original.

(iii) The position and the inclination of the developing device with respect to the photosensitive member is not the same, that is, they are different if the color is different. This requires that the developing devices be designed exclusively for the respective colors resulting in longer research and development efforts and in a higher cost of manufacturing.

(iv) In an apparatus using an electrophotographic process, various maintenance operations are necessary over a period of time, for example, replacement of the photosensitive drum, replenishment or replacement of the developer agent, cleaning of the corona discharge wire and other adjustments and replacements. Those maintenance operations are covered by expert servicemen, who are sent to the office on demand. However, such servicing is disadvantageous since the user has to wait for the serviceman to arrive before the user can restart the operation. On the other hand, the makers and dealers have to establish a servicing organization and this involves the cost for the servicemen and the cost for educating them. In the case of multi-color copying apparatus or multi-color printing apparatus, the mechanisms are highly complicated so that higher expert knowledge and skill are needed, which in turn increases the cost as compared with an ordinary copier or printer.

SUMMARY OF THE INVENTION

Accordingly, the principal object of the present invention is to overcome the drawbacks involved in the conventional multi-color image forming apparatus.

Another object of the present invention is to provide a multi-color image forming apparatus which is less costly in manufacturing.

A further object of the present invention is to provide a multi-color image forming apparatus which does not require maintenance which entails expert knowledge.

A further object of the present invention is to provide a multi-color image forming apparatus which does not require time-consuming maintenance.

A yet further object of the present invention is to provide a multi-color image forming apparatus having a mechanism which is effective to prevent erroneous handling during maintenance operation.

An image forming apparatus according to an embodiment of the present invention which achieves the foregoing objects, comprises plural image forming process units each of which has the image forming function, and which share the respective color-components image formations. The image receiving material passes by the image forming process units sequentially to receive the respective color-component images superposedly, so that a desired multi-color image is formed thereon. Each of the image forming process units contains all or a part of the means needed for the image formation as a unit, so that each of the units is detachably mountable into the multi-color image forming apparatus.

The image forming process is not limiting in the present invention, for example, the so-called Carlson process, NP process or other processes may be used. Also, electrostatic photography or recording may be used, wherein the image receiving material is insulating (dielectric), and the electrostatic latent image is formed and developed thereon.

These and other objects, features and advantages of the present invention will become more apparent upon a consideration of the following description of the preferred embodiment of the present invention taken in conjunction with the accompanying drawings.

BRIEF DESCRIPTION

DESCRIPTION OF THE PREFERRED EMBODIMENTS

Figure 2:
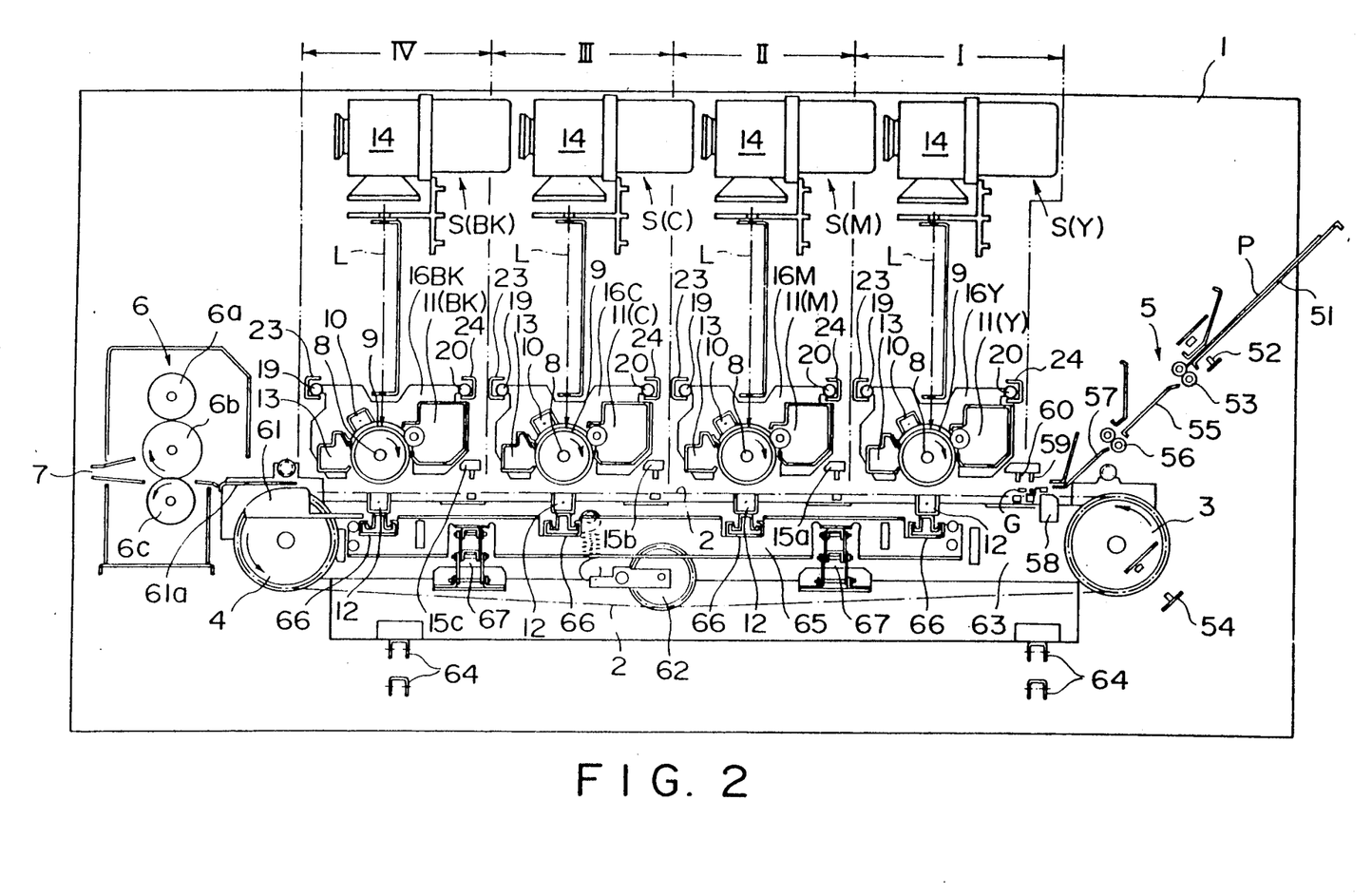
FIG. 2 shows a cross-section of an image forming apparatus according to an embodiment of the present invention.

Referring now to FIG. 2, the image forming apparatus according to an embodiment of the present invention includes four sets of electrophotographic laser beam printer mechanisms as the plural image forming mechanisms. The image forming apparatus has a casing 1 in which there are provided first, second, third and fourth laser beam printer mechanisms (hereinafter also called printer mechanisms) I, II, III and IV arranged in the order named, as seen on FIG. 2 from the righthand side to the lefthand side. The image forming apparatus further includes a sprocket 3 disposed at the lower right side of the first printer mechanison Nison I, and a sprocket 4 disposed at the lower left side of the fourth printer mechanism IV. At the rear side of the sprocket 3, an additional sprocket is provided, although not seen in this Figure. Similarly, an additional sprocket is provided at the rear side of the sprocket 4. Around the front sprockets 3 and 4, a chain 2 is entrained, and similarly another chain is entrained around the rear sprocket. Bridging the front and rear chains, a gripper G for gripping an image transfer sheet is fixed to the chains. At the other portions of the chains, electrically insulating wires are stretched between both chains to carry the image transfer sheet. The chains are driven by the sprockets rotating in the directions shown by the respective arrows. Together with the movement of the chains driven by the sprockets, the gripper G moved. The image forming apparatus further includes a sheet feed mechanism 5 at the righthand side of the chain 2, image fixing means 6 at the lefthand side of the chain 2 and a discharge opening 7 for discharging the transfer sheet having an image thereon out of the image forming apparatus.

The printer mechanisms I, II, III and IV are essentially and substantially the same in structure thereof. Each of the printer mechanisms includes a drum type electrophotographic photosensitive member 9 (hereinafter called also as "photosensitive drum" or simply "drum"), as a recording medium, which is driven to rotate about a shaft 8; a corona charger 10, developing means 11, a transfer corona discharger 12 and a cleaner 13 located around the photosensitive drum 9 in the order named; and a laser beam scanner 14 above the photosensitive drum 9.

The laser beam scanner 14 includes a semiconductor laser, polygonal mirror, f-θ lens and light blocking plate. It receives serial electric digital signals, i.e., picture element signals generated by an image reader or computer which processes image signals and produces a laser beam L modulated in accordance with the signals. The beam scans the surface of the photosensitive drum 9 in the direction of the length of the drum at a position between the corona charger 10 and the developing means 11, thus exposing image-wisely the drum 9 surface to the light carrying the image information.

It should be noted, however, that each of the printer mechanisms I, II, III and IV contains the developing means 11 for yellow toner Y, magenta toner M, cyan toner C and black toner BK, respectively. Correspondingly, the printer mechanisms I, II, III and IV receive the picture element signals S (Y) for the yellow component image, the picture element signals S (M) for the magenta component image, the picture element signals S (C) for the cyan component image and the picture element signals S (BK) for the black component image.

Upon turning on the main switch, the laser beam scanners and the other process means and mechanisms of the printer mechanisms I, II, III and IV are energized or driven, and also, the heater in the image fixing device 6 is turned on the start the warming-up operation of the image forming apparatus. When the laser beam generator assumes the ON state, the rotational speed of the scanner reaches a predetermined value, and the fixing roller of the image fixing device is heated to a predetermined temperature, then the printer is ready for operation.

The transfer sheet P as a medium to be recorded is fed to the guide 51 of the sheet feeding mechanism 5, then the leading edge thereof is detected by the first photointerruptor 52 so that a start signal (a start signal for printing sequence) is generated. Upon the start signal, the drums 9 of all of the printer mechanisms I, II, III and IV start their rotation. At this time, a couple of first register rollers 53 are not yet driven.

Then, the sprockets 3 and 4 start to run the gripper G. Upon the gripper G passing through a second photointerruptor 54, the first sheet register roller couple 53 starts rotation at a constant speed to feed the transfer sheet P along the guide 55 to a second couple of register rollers 56. At this time, the second register roller couple 56 is not driven as yet, so that a loop of the transfer sheet P is formed between the first couple 53 and the second couple 56. The second couple 56 of the register rollers starts the rotation at a constant speed with a predetermined delay from the signal outputted from the second photointerruptor 54 to advance the transfer sheet P along the guide 57.

When the gripper G passes by the gripper opening cam 58, the gripper opens, while actuating a third photointerruptor 59, upon which the photointerruptor 59 generates a signal to rotate the second couple 56 of the register rollers at twice the speed for a predetermined period of time, so that the leading edge of the transfer sheet P enters the gripper G which is kept open. The gripper G closes when it passes out the opening cam 58, so that the leading edge of the transfer sheet P is gripped by the gripper G. The speed of the second couple 56 of the register rollers returns to the usual speed, so that there is no loop formation of the transfer sheet P between the second couple 56 and the gripper G.

When the gripper G further moves to actuate a fourth photointerruptor 60, a signal generates to start the image forming processes for the respective photosensitive drums 9 of the printer mechanisms I, II, III and IV. As a result, the drums 9 of the printer mechanisms I, II, III and IV now have a yellow image, magenta image, cyan image and black image, respectively, as color-component images of a multi-color original. The process of the image formation in each of the printer mechanism may be the one which is well known. Therefore, the detailed explanation thereof has been omitted for the sake of simplicity.

The transfer sheet P with its leading edge gripped by the gripper, is moved by the chain 2 under the printer mechanisms I, II, III and IV toward the fixing means 6. During this movement, the transfer sheet P receives from the respective photosensitive drum 9 yellow toner image, magenta toner image, cyan toner image and black toner image sequentially and superposedly, so that the color-component images are synthesized to be one multi-color image. The gripper G is then opened by a cam 61, so that the transfer sheet P is released after it passes the fourth printer mechanism IV. The released transfer sheet P then rides on a separation pawl 61a away from the chain conveyor 2 to enter the fixing device 6, where the multi-color toner image is fixed. Finally, the transfer sheet P is discharged out of the image forming apparatus as a multi-color print.

The chain 2 continues rotating until the gripper G returns to its home position, and then stops. This is the end of the one cycle of the printing sequence.

Between adjacent printer mechanisms, fifth, sixth and seventh photointerruptors 15a, 15b and 15c are provided along the moving passage of the gripper G to detect the gripper G and determine the timing of the start of image formation at each of the printer mechanisms I, II, III and IV.

The transfer sheet driving mechanism includes a tension sprocket 62 for preventing the possible slack of the chain 2. The sprockets or rollers 3 and 4, the chain 2 and tension sprockets 62 are mounted on a frame 63 as a unit, which is supported for up and down movement by pantagraph supporters 64 and 64. The transfer corona dischargers 12 for the respective printer mechanisms I, II, III and IV are retractably supported along respective guide rails 66 extending in the direction perpendicular to the drawing of FIG. 2. The rails 66 are supported on a common frame 65, which is supported by pantagraph supporters 67 and 67 for up and down movement.

Because of those arrangements, the transfer sheet feeding mechanism unit and/or the common frame 65 for the transfer corona dischargers can be moved downwardly to open wide the transfer sheet passage to allow the access thereto, for example, when a jam of the transfer sheet P occurs.

The fixing device 6 shown in the Figure is of the heating roller type, and contained in a thermal insulating housing. It has an upper roller 6a including a core metal coated with Teflon (trademark), an intermediate roller 6b including a core metal coated with a silicon rubber and a lower roller 6c including a core metal coated with Teflon (trademark).

In the embodiment shown, each of the laser beam printer mechanisms I, II, III and IV is loaded with a process unit which contains, among the various process executing means of the printer mechanisms, the photosensitive drum 9, corona discharger 10, developing means 11 and cleaner 13, as a unit. The process units for the printer mechanisms I, II, III and IV are depicted by reference numerals 16(Y), 16(M), 16(C) and 16(BK). The units are detachable from the image forming apparatus independently from each other.

Figure 3:
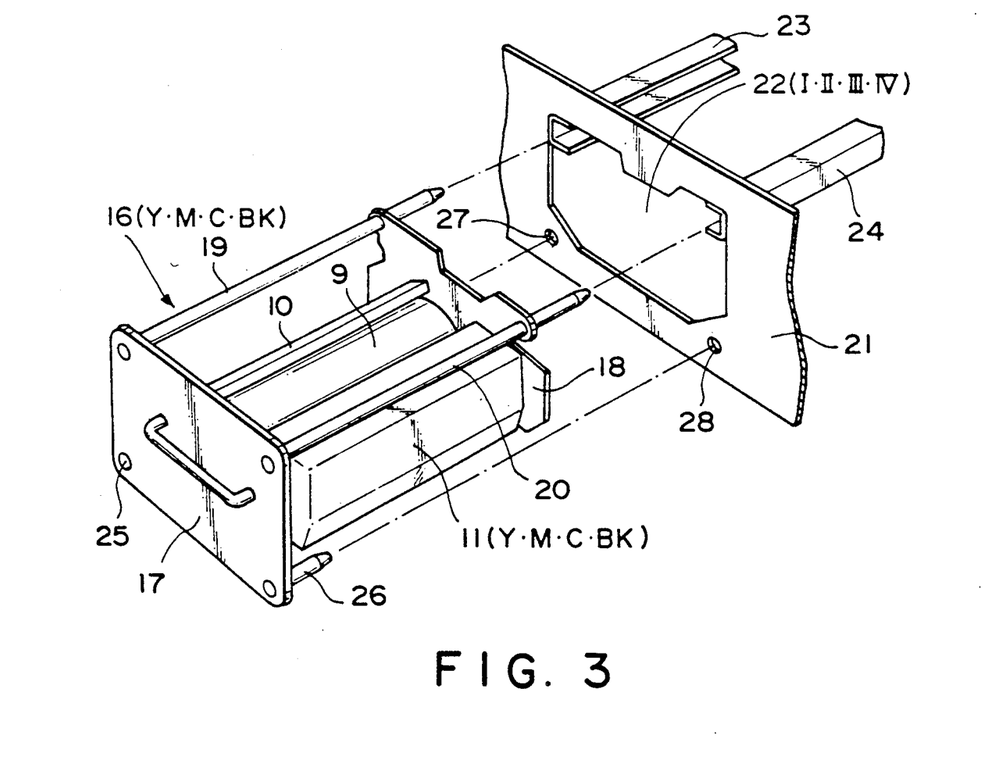
FIG. 3 is a perspective view of the process unit used with the image forming apparatus of FIG. 2.

As shown in FIG. 3, the photosensitive drum 9, charger 10, developing means 11 and cleaner 13 are mounted as a unit between front and rear wall plates 17 and 18. Those elements, i.e., the photosensitive drum 8, charger 10, developing means 11 and cleaner 13 are so designed that they have substantially the same service lines. The printer mechanisms I, II, III and IV are provided with respective openings 22I, 22II, 22III and 22IV in its front wall 21, which openings are so shaped as to receive the respective units. The printer mechanism is provided with a couple of channel members 23 and 24, at the upper portion of the opening 22, which extend between the front wall 21 and the unshown rear wall. The channel members 23 and 24 are adapted to receive the reinforcing stays 19 and 20 of the process unit. When the process unit is to be mounted into the image forming apparatus, the rear side wall 18 is inserted into the opening 22 with the stays 19 and 20 guided by the channel members 23 and 24, until it stops. Then, the pins 25 and 26 are engaged into holes 27 and 28 formed in the front wall 21 of the printer mechanism.

When, on the other hand, the process unit is to be taken out of the image forming apparatus, it is simply pulled out through the opening 22.

When the process unit is to be mounted into or demounted from the image forming apparatus, an unshown front door thereof is opened beforehand, to expose the front wall 21.

In FIG. 2, the transportation of the transfer material is shown as being carried out by a gripper which grips a sheet, but other types of the transfer paper and the transporting mechanisms are usable, such as fan-folded paper having performations, or electrostatic attraction force in place of the mechanical gripping.

Figure 4:
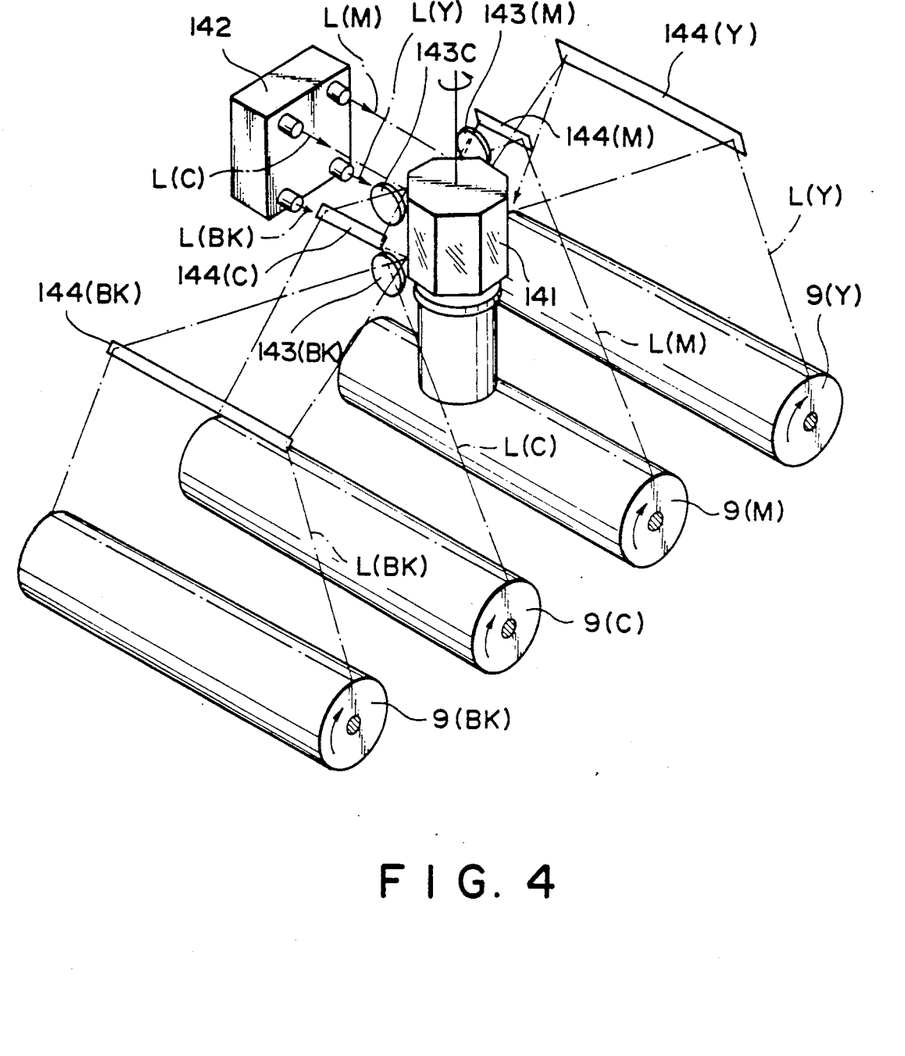
FIG. 4 is a perspective view of an example of a laser beam scanner usable with the image forming apparatus of the present invention.

The laser beam scanner 14 of the printer mechanism may have the structure as shown in FIG. 4, wherein a single polygonal mirror 141 is used for the four laser beam generators which put together as a laser beam generating unit 142.

The laser beam generating unit 142 produces four laser beams L (Y), L (M), L (C) and L (BK) which correspond, respectively, to yellow component image of the desired multi-color image to be printed, magenta component image theroef, cyan component image thereof and black component image thereof. The laser beams are directed through an f-$\theta$ lenses 143(Y) for yellow component, 143(M) for magenta component, 143(C) for cyan component and 143(BK) for black component, reflecting mirrors 144(Y) for yellow component, 144(M) for magenta component, 144(C) for cyan component and 144(BK) for black component, to the photosensitive drums 9(Y) for yellow component, 9(M) for magenta component, 9(C) for cyan component and 9(BK) for black component.

Because of the structures provided by the present invention, the following advantages are brought about:

(i) The transfer sheet as the material to be recorded is not wound around a transfer drum, and therefore, the sheets can be fed out continuously. For this reason, the throughput of the multi-color image forming apparatus is nearly equal to that of a monochromatic image forming apparatus, assuming that the process speeds are the same.

(ii) If the number of colors to be transferred is to be increased, units having the same constructions are simply added, while the throughputs of the one-color printer, two-color printer, three-color printer and four-color printer are substantially the same.

(iii) In the electrophotographic process of the individual printer mechanisms, the distances between the image exposure positions and the developing positions are the same, so that the dark decay and the bright part attenuation are uniform among the printer mechanisms. The so-called "$\gamma$" properties are the same, with the result that the tone of the color can be made even for the different colors.

(iv) The positioning and the inclination of the developing device does not differ among the printer mechanisms, so that research and development of the developing device require shorter time, and also the manufacturing cost can be decreased by the increase of the scale merit.

(v) Major parts for the image formation of each of the printer mechanisms I, II, III and IV are put together as a unit (kit), 16(Y), 16(M), 16(C) or 16(BK), which is detachably mountable into the printer mechanisms, so that, when the unit is used up to its service life or when some part of the means within the unit fails, the unit may be replaced by a fresh one. Thus, the electrophotographic recording mechanism can reset to a correct state without expert knowledge or skill. The cost of the unit may be reduced by mass-production. Of course, the replacement of the process unit can be carried out by users. Therefore, the users can enjoy the advantage of shorter downtime, while the maker can reduce the cost for the serving organization.

Thus, the drawbacks of the conventional machines enumerated hereinbefore can be eliminated.

Figure 5:
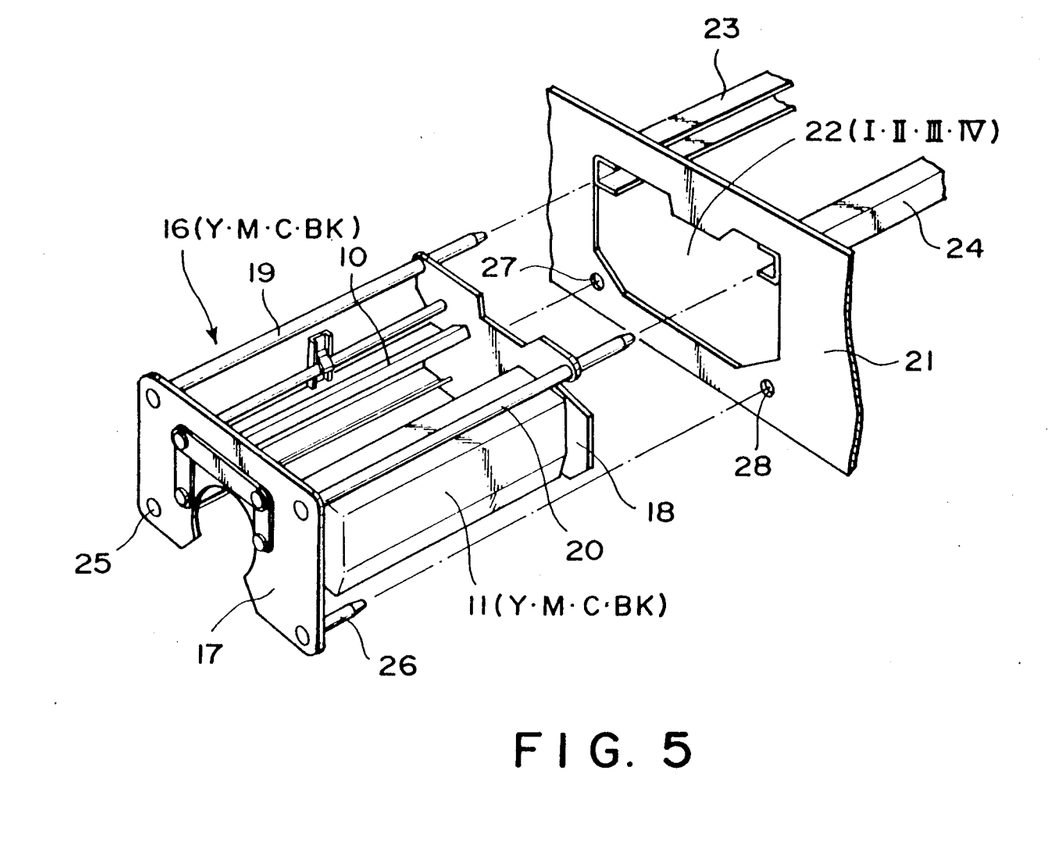
FIG. 5 is a perspective view of an image forming apparatus according to another embodiment of the present invention.

FIG. 5 shows another embodiment of the present invention, wherein the photosensitive drum is provided in the main assembly of the printer mechanism, that is, it is not contained in the process unit. In this embodiment, the process unit includes, among the image forming process executing elements, the charger 10, developing means 11 and cleaner 13. This applies to all of the process units 16(Y), 16(M), 16(C) and 16(BK). The process units are detachably mountable into the respective printer mechanisms. The printer mechanisms I, II, III and IV are provided with respective openings 22I, 22II, 22III and 22IV in its front wall 21, which openings are so shaped as to receive the respective units. The printer mechanism is provided with a couple of channel members 23 and 24, at the upper portion of the opening 22, which extends between the front wall 21 and the unshown rear wall. The channel members are adapted to receive the reinforcing stays 19 and 20 of the process unit. When the process unit is to be mounted into the image forming apparatus, the rear side wall 18 is inserted into the opening 22 with the stays 19 and 20 guided by the channel members 23 and 24, until it stops.

Then, the pins 25 and 26 provided on the back side of the front wall 17 and projecting toward the rear wall 18, are received by the corresponding holes 27 and 28 formed in the front wall 21 of the printer mechanism. The process unit stops by the back side of the unit front wall 17 abutting to the front side of the front wall 21 of the printer mechanism. The pins 25 and 26 are effective to correctly position the process unit with sufficient precision.

Each of the process units may be provided with a mechanism which displaces or pivots a little the developing means 11 and cleaner 13 away from the photosensitive drum 9, which the process unit is attached to or detached from the image forming apparatus to prevent a possible damage to the photosensitive drum 9, by the developing roller or cleaning blade which are contacted to the photosensitive drum 9 when the process unit is set in the printer mechanism. Detailed structure therefor has been omitted for the sake of simplicity of explanation.

Next, there will be described a mechanism for preventing erroneous operation which might occur when the process unit is replaced, for maintenance, for example. From the foregoing explanation, it will be understood that, after any of the process units 16(Y), 16(M), 16(C) and 16(BK) are taken out of the printer mechanisms for maintenance, inspection, repairing or the like, the removed units or a fresh units to replace them must be set into the right printer mechanisms, respectively. This applies to both of FIG. 3 embodiment and FIG. 5 embodiment. However, as described above, the appearance of the process units are substantially the same, so that an erroneous setting can occur, or so that the operator becomes not aware of which unit is to be set in which printer mechanism.

The embodiment of the present invention includes the structure for preventing this. According to the embodiment, upon the insertion of the process unit 16(Y), 16(M), 16(C) and 16(BK) into the printer mechanisms I, II, III and IV, an interference takes place between the process unit and the printer mechanism when the unit is not to the right one of the printer mechanisms, so that the unit cannot be inserted up.

Figure 6:
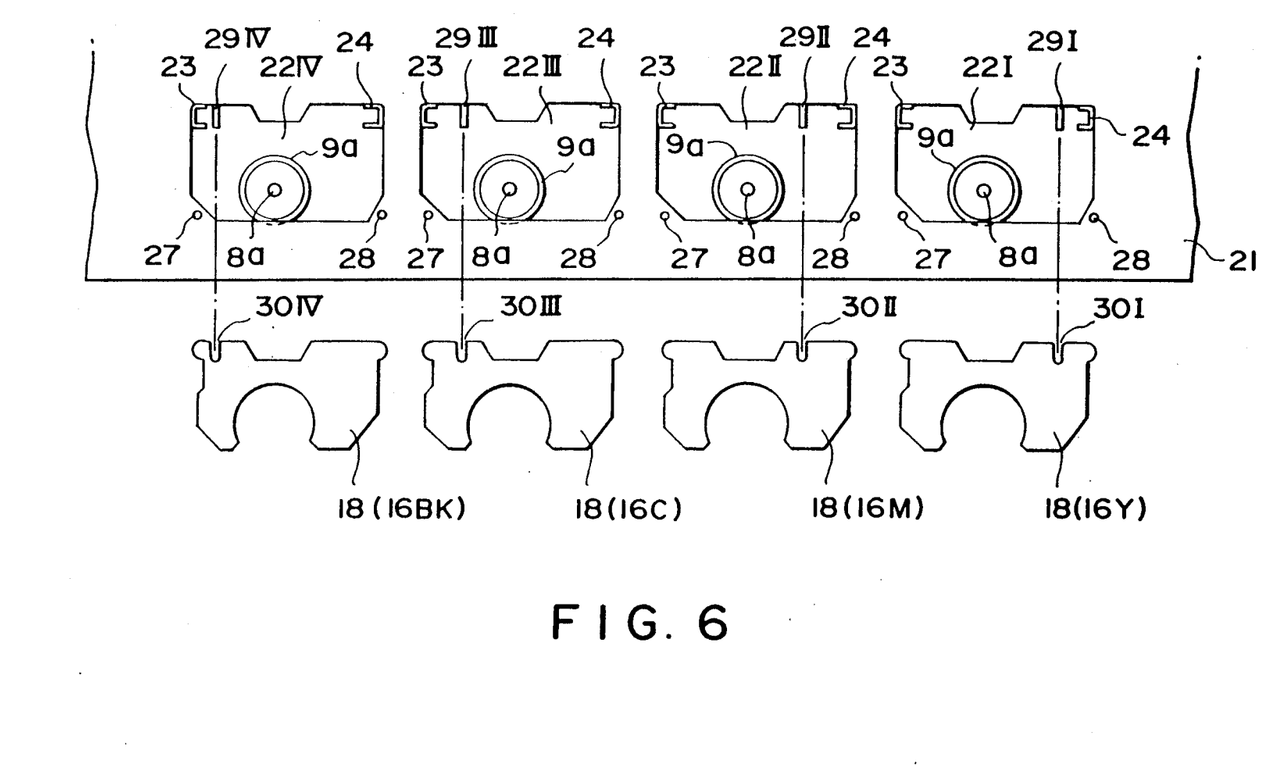
FIG. 6 illustrates the relation between each of the process units and the image forming apparatus, according to an embodiment of the present invention.

In FIG. 6, the openings 22I, 22II, 22III and 22IV are provided with fixed pins 29I, 29II, 29III and 29IV, respectively, at the upper peripheries thereof. The horizontal positions of the pins 29I, 29II, 29III and 29IV are different as shown. Correspondingly, the process units 16(Y), 16(M), 16(C) and 16(BK) have respective notches 30I, 30II, 30III and 30IV on their rear walls 28 at their upper parts. The horizontal positions of the notches are such that the notches correspond to the pins or projections of the right ones of the openings, respectively, so that the pins and openings function interrelatedly to prevent the process units from being placed in a wrong position.

Therefore, when the first process unit 16(Y) is going to be set to the opening 22I; when the second process unit 16(M) is going to be set to the opening 22II; when the third unit 16(C) to the opening 22III; or when the fourth unit 16(BK) to the opening 22IV, no interference between the notches and the pins occurs, so that the units are allowed to enter. However, the insertion in any other combinations than stated above is going to interfere with the rear walls 18 of the process unit to prevent the insertion thereof of the wrong unit. The operator can recognize the error without difficulty, and the wrong process unit is prevented from setting in, without fail.

Figure 7:
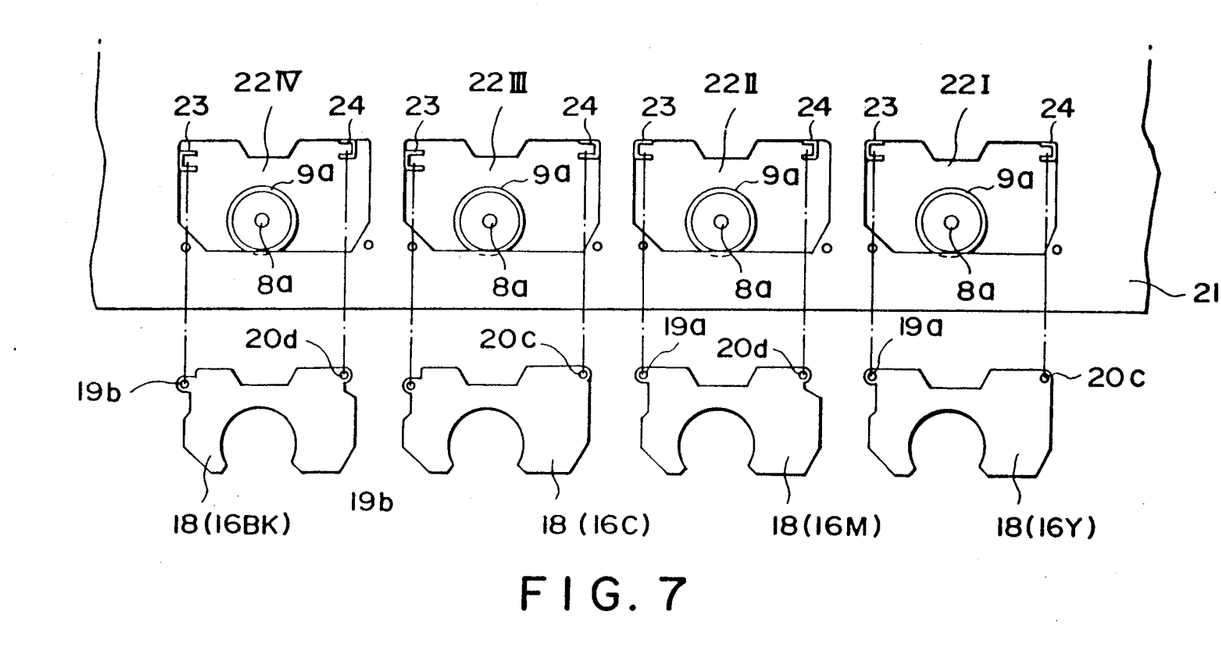
FIG. 7 illustrates the relation between each of the process units and the image forming apparatus, according to another embodiment of the present invention.
Figure 8:
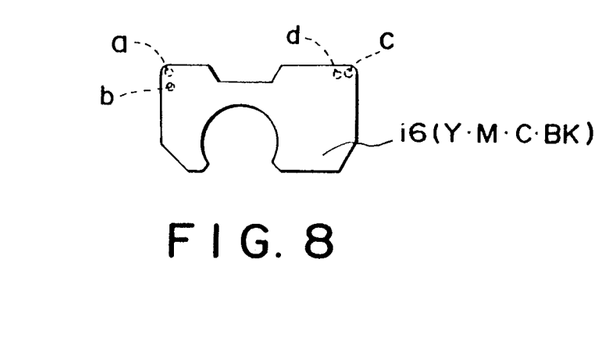
FIG. 8 is a front view of a process unit used with the image forming apparatus of FIG. 7.

Another embodiment for this prevention is illustrated in FIGS. 7 and 8, wherein the positions of the stays 19 and 20 are made different for individual units 16(Y), 16(M), 16(C) and 16(BK). For example, as shown in FIG. 8, the unit 16(Y) has the stays at positions a and c; the unit 16(M), at positions a and d; the unit 16(C), at positions b and c; and the unit 16(BK), at positions b and c. Correspondingly, the guiding channels 23 and 24 of the printer mechanisms so positioned that they can receive only the couple of stays of right ones of the process units.

Because of these arrangements, the process units 16(Y), 16(M), 16(C) and 16(BK) can enter the openings 22 only when they are inserted to the openings 22I, 22II, 22III and 22IV, respectively. The insertion of the process units 16(Y), 16(M), 16(C) and 16(BK) in any other combinations is not possible because of the wrong combination between the channel members 23 and 24 and the stays 19 and 20.

Figure 9:
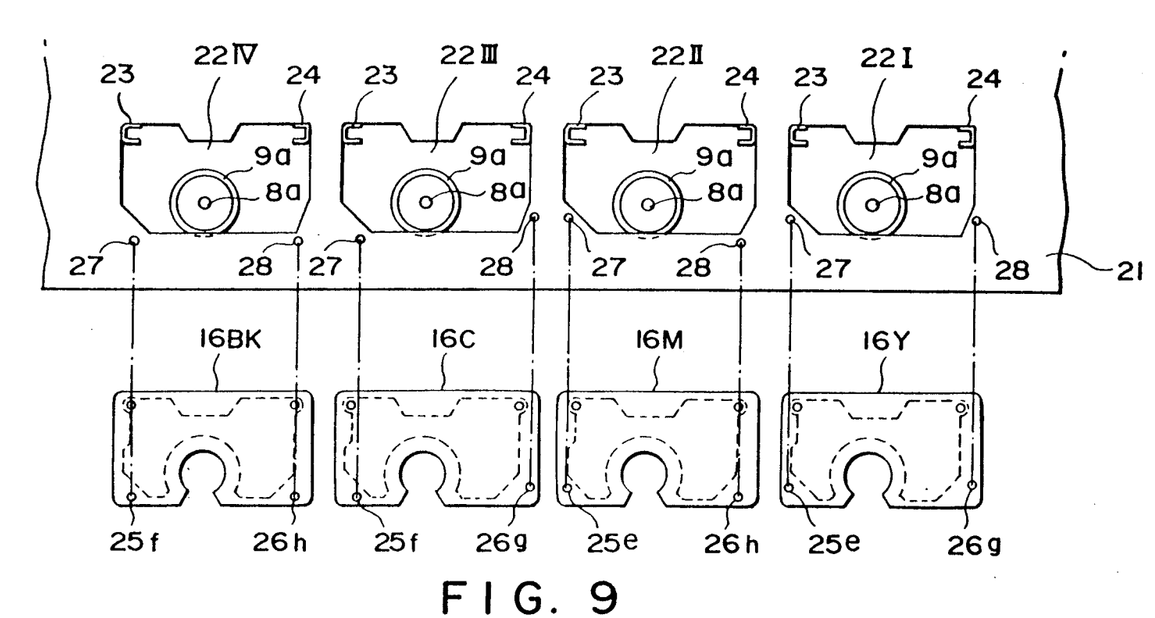
FIG. 9 illustrates the relation between each of the process units and the image forming apparatus, according to a further embodiment of the present invention.
Figure 10:
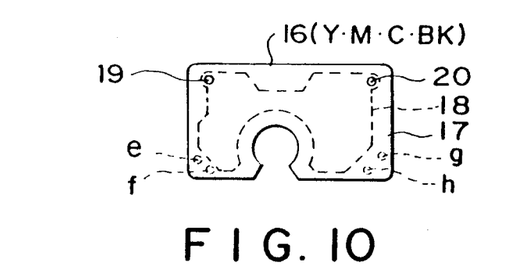
FIG. 10 is a front view of a process unit used with the image forming apparatus of FIG. 7.

A further embodiment is disclosed in FIGS. 9 and 10, wherein the positions of the pins 25 and 26 of the process units, provided on the back side of the front wall 17, are made different for individual units. As an example, FIG. 8 shows the positions for all of the process units. The first process unit 16(Y) has the pins at positions e and g; the second unit 16(M) has them at positions e and h; the third unit 16(C), at positions f and g; and the fourth unit 16(BK) at f and h. Correspondingly the front walls 21 of the printer mechanisms have the holes for receiving the correct ones of the pins of the process unit.

Because of these arrangements, the process units 16(Y), 16(M), 16(C) and 16(BK) can enter the openings 22 only when they are inserted to the openings 22I, 22II, 22III and 22IV, respectively. When they are inserted in any other combination, they can be inserted to some extent but not to the extreme extent, since both or one of the pins 25 and 26 abut the front side of the front wall 21. So, only incomplete insertion is possible, not complete insertion.

Thus, according to the present invention, any of the process units cannot be set in wrong printer mechanisms so that the insertion thereof into right ones is ensured. It is possible for the user to effect maintenance or inspecting operations without the possibility of wrong placement of the process units.

Although the preventing structures are explained in conjunction with FIG. 6 embodiment, the same can apply to the embodiment of FIG. 3. The content of the process unit shown in the Figures is not limiting, but the process unit can contain the photosensitive drum 9 and the developing means only, or the photosensitive drum 9, the developing means and cleaner only.

In the foregoing explanations of the embodiments, the same reference numerals are assigned to the elements which has essentially the same functions, despite some minor differences in detailed structure, for the sake of the simplicity of the explanation.

While the present invention has been particularly shown and described with reference to preferred embodiments thereof, it will be understood by those skilled in the art that various changes are modifications in form and details may be made therein without department from the spirit and scope of the invention.

What is claimed is:

1. A color image forming apparatus comprising:
plural color image forming stations for forming images of different colors;
a plurality of process units, each detachably mountable into an associated one of said plural color image forming stations respectively, each said process unit including process means for image formation in a different one of the different colors, said process means including at least developing means for developing images formed by said process means, each said process means of said plurality of process units being constructed substantially identically with the other said process means, each color image forming station including a guide for guiding the mounting of the associated unit into said image forming station;
interfering means provided at each said color image forming station, wherein said interfering means and said process units function interrelatedly for receiving only that one of the process units which is for the same color as the color in which said color image forming station is operated;

transporting means for transporting a transfer material for superposedly receiving images at said color image forming stations; and image transferring means corresponding to respective color image forming stations for transferring images at said color image forming stations superposedly.

2. A unit according to claim 1, wherein said unit contains as said process means a photosensitive member, electric charger, and cleaning means.

3. A unit according to claim 1, wherein said unit contains as said process means electric charger, and clanking means.

4. An apparatus according to claim 1, wherein each said interfering means includes a projection and a corresponding recess, one being provided in the associated process unit and the other in said color image forming station.

5. An apparatus accounting to claim 1, wherein each said interfering means includes a pin and a corresponding recess, one being provided in the associated process unit and the other in said color image forming station.

6. An apparatus according to claim 1, wherein said interfering means includes guide members provided in said color image forming station at different positions for individual image forming stations, and members of said process unit for sliding along the guide members.

7. An apparatus according to claim 1, wherein said process means includes a photosensitive drum and another process means, said process unit is mounted into said color image forming station by inserting it in a direction of a rotational axis of said drum.

8. A color image forming apparatus into which a plurality of process units are detachably mountable, said process units each including process means for image formation, said process means including at least developing means for developing images formed by said process means, said apparatus comprising:

plural color image forming stations for receiving said process unit and for forming images of different colors, each said color image forming station including a guide for guiding the mounting of an associated process unit into said color image forming station;

interfering means, provided for each color image forming station, wherein said plurality of process means are substantially identically constructed and each said interfering means is keyed to its associated process unit so that said interfering means and said process units function interrelatedly for preventing the mounting of a process unit for forming an image in a color other than a predetermined color for that color image forming station;

transporting means for transporting a transfer material for superposedly receiving images at said color image forming stations; and image transferring means corresponding to respective color image forming stations for transferring images at said color image forming stations superposedly.

9. An apparatus according to claim 8, wherein said interfering means includes said guides which are different depending on the color image formed by the associated process unit.

10. An apparatus according to claim 8, wherein said interfering means includes a side plate for each of said image forming stations, the side plates being different depending on the color image formed at each station.

11. A process unit according to claim 8, wherein said process means includes a photosensitive drum and another process means, said process unit is mounted into said color image forming station by inserting it in a direction of a rotational axis of said drum.

12. A unit according to claim 8, wherein each unit contains as said process means a photosensitive member, electric charger, and cleaning mans.

13. A unit according to claim 8, wherien said unit contains as said process means electric charger, and cleaning means.

* * * * *

UNITED STATES PATENT AND TRADEMARK OFFICE
CERTIFICATE OF CORRECTION

PATENT NO. : 5,014,094

DATED : May 7, 1991

INVENTOR(S) : JOJI AMITANI, ET AL

It is certified that error appears in the above-identified patent and that said Letters Patent is hereby corrected as shown below:

On the title page, before item [57] the "Attorney, Agent, or Firm" should read as follows:

--Fitzpatrick, Cella, Harper & Scinto--.

COLUMN 1

Line 28, "typical a" should read --a typical--.

COLUMN 2

Line 35, "type there" should read --type, there-- and "the, the the" should read --the--.

COLUMN 3

Line 29, "share" should read --shares-- and "color-components" should read --color-component--.

Line 51, "BRIEF DESCRIPTION" should read --BRIEF DESCRIPTION OF THE DRAWINGS--.

COLUMN 4

Line 26, "mechanison Nison I" should read --mechanism I--.

Line 42, "moved" should read --moves--.

UNITED STATES PATENT AND TRADEMARK OFFICE
CERTIFICATE OF CORRECTION

PATENT NO. : 5,014,094

DATED : May 7, 1991

INVENTOR(S) : JOJI AMITANI, ET AL

It is certified that error appears in the above-identified patent and that said Letters Patent is hereby corrected as shown below:

COLUMN 5

Line 1, "image-wisely" should read --imagewise--.
    Line 17, "the start" should read --to start--.
    Line 68, "anism" should read --anisms--.

COLUMN 6

Line 67, "drum 8" should read --drum 9--.

COLUMN 7

Line 28, "performations" should read --perforations--.
    Line 39, "theroef" should read --thereof--.

COLUMN 9

Line 8, "a" should be deleted.
    Line 58, "mechanisms so" should read --mechanisms are so--.

COLUMN 10

Line 37, "has" should read --have--.
    Line 43, "are" should read --and--.
    Line 44, "department" should read --departing--.

UNITED STATES PATENT AND TRADEMARK OFFICE
CERTIFICATE OF CORRECTION

PATENT NO. : 5,014,094

DATED : May 7, 1991

INVENTOR(S) : JOJI AMITANI, ET AL

Page 3 of 3

It is certified that error appears in the above-identified patent and that said Letters Patent is hereby corrected as shown below:

COLUMN 11

Line 8, "A unit" should read --An apparatus--.

Line 11, A unit" should read --An apparatus--.

Line 13, "clanking means" should read --cleaning means--.

Line 40, "process unit" should read --process units--.

COLUMN 12

Line 29, "A process unit: should read --An apparatus--.

Line 34, "A unit" should read --An apparatus-- and "each unit" should read --said unit--.

Line 36, "cleaning mans" should read --cleaning means--.

Line 37, "A unit" should read --An apparatus-- and "wherien" should read --wherein--.

Signed and Sealed this

Second Day of March, 1993

*Attest:*

STEPHEN G. KUNIN

*Attesting Officer*    Acting Commissioner of Patents and Trademarks